Dec. 3, 1968 E. G. COCCAGNA 3,414,893

MULTICHANNEL TRASDUCING HEAD WITH SELECTABLE FLUX PATHS

Filed July 15, 1965 3 Sheets-Sheet 1

INVENTOR.
EDMUND G. COCCAGNA

INVENTOR.
EDMUND G. COCCAGNA

Dec. 3, 1968 E. G. COCCAGNA 3,414,893

MULTICHANNEL TRASDUCING HEAD WITH SELECTABLE FLUX PATHS

Filed July 15, 1965 3 Sheets-Sheet 3

INVENTOR.
EDMUND G. COCCAGNA

United States Patent Office 3,414,893

Patented Dec. 3, 1968

3,414,893

MULTICHANNEL TRANSDUCING HEAD WITH SELECTABLE FLUX PATHS

Edmund G. Coccagna, Villanova, Pa., assignor to Burroughs Corporation, Detroit, Mich., a corporation of Michigan Filed July 15, 1965, Ser. No. 472,224
11 Claims. (Cl. 340—174.1)

ABSTRACT OF THE DISCLOSURE

A magnetic head is disclosed for use in a magnetic recording system for writing a magnetized pattern upon a magnetic medium and for reading the pattern so written. The magnetic head portion of the device which includes the magnetic flux path gap is uniquely configured to provide a plurality of such magnetic paths each with its own gap. The head with such a gap configuration is then used with an appropriate selecting means to select any one of the plurality of paths and thereby enable one signal coil wound upon the common core portion of the head to selectively read or write in any one of a number of adjacent channels upon the magnetic medium.

This invention relates to a multichannel magnetic head. The present day requirement of increased information density on a recording medium, as well as the concomitant demand for cost reduction, is particularly accentuated in the art of multichanneled recording and reading. Further, in the computer art especially, there is a perennial need to reduce the number of required components to perform a given function in order to increase reliability and, consequently, accuracy. In the past, multichannel or multitrack recording on a magnetic media was usually accomplished by logically assigning a particular address to each available track. The addressing system could be any of several forms: binary, binary coded decimal, binary coded octal, and so forth. In any event, the address signal information was applied to a radix converter which converted the information into a signal form commonly known as one-out-of-*n* digital form. In effect then, the digital signal contains information as to which channel or track is to be recorded or read. The radix converter output signal is then utilized to switch to the correct head associated with that channel and this is accomplished by supplying the radix converter output signal to a head switching circuit which in cooperation with the read and write amplifiers completes the circuit to the magnetic head associated with the track. Thus, it is seen that the prior art required three separate entities, the radix converter, the switching means, and the head. Radix conversion and head switching are frequently accomplished electromechanically. However, electronic circuits using either vacuum tubes or semiconductor devices have found increasing acceptance. The present invention has the advantage of providing in a single head a multichannel magnetic recording means which automatically accomplishes the radix conversion and magnetically provides the head switching functions to thereby eliminate the additional equipment mandatory with former systems.

In the practice of the invention there is provided a magnetic head for reading and writing which comprises a magnetic core member having a read-write coil thereon and adapted for receiving an induced EMF and for supplying a magnetomotive force respectively. The core member comprises a plurality of stages arranged in cascade, each succeeding stage branching out into a plurality of flux paths which divide and subdivide in predetermined fashion, the final stage containing *n* air gaps. The flux path is completed from the air gap through to the input to the first stage. A plurality of one or more bistable devices are associated with each stage. In the example embodiment shown, at each branching point one output of the bistable device is connected to a coil arranged transversely in a respective flux path while the other output of the bistable device is connected to a coil arranged transversely in the other of said flux paths. Thus, each bistable device applies the necessary signals to all branching segments of one stage to thereby block the flow of flux through the appropriate branches by means of magnetic saturation. While only two segments are shown, if at each branching point the head core branches to more than two branches per stage, some degree of radix conversion is required between the address register and the multibranch head. If, for example, the fan-out at each branching point is four, a radix converter must be provided to take the signals from the appropriate two bistable devices in the address register and provide a one-out-of-four type of output which provides current to block three out of the four branches at the corresponding branching point.

Accordingly, it is an object of this invention to provide an improved magnetic head selection system which is capable of providing multichannel selection in a single head winding.

A further object is to provide an improved magnetic head of reliable operation which is relatively inexpensive and which may be packaged as a small compact unit.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figures 1, 2:
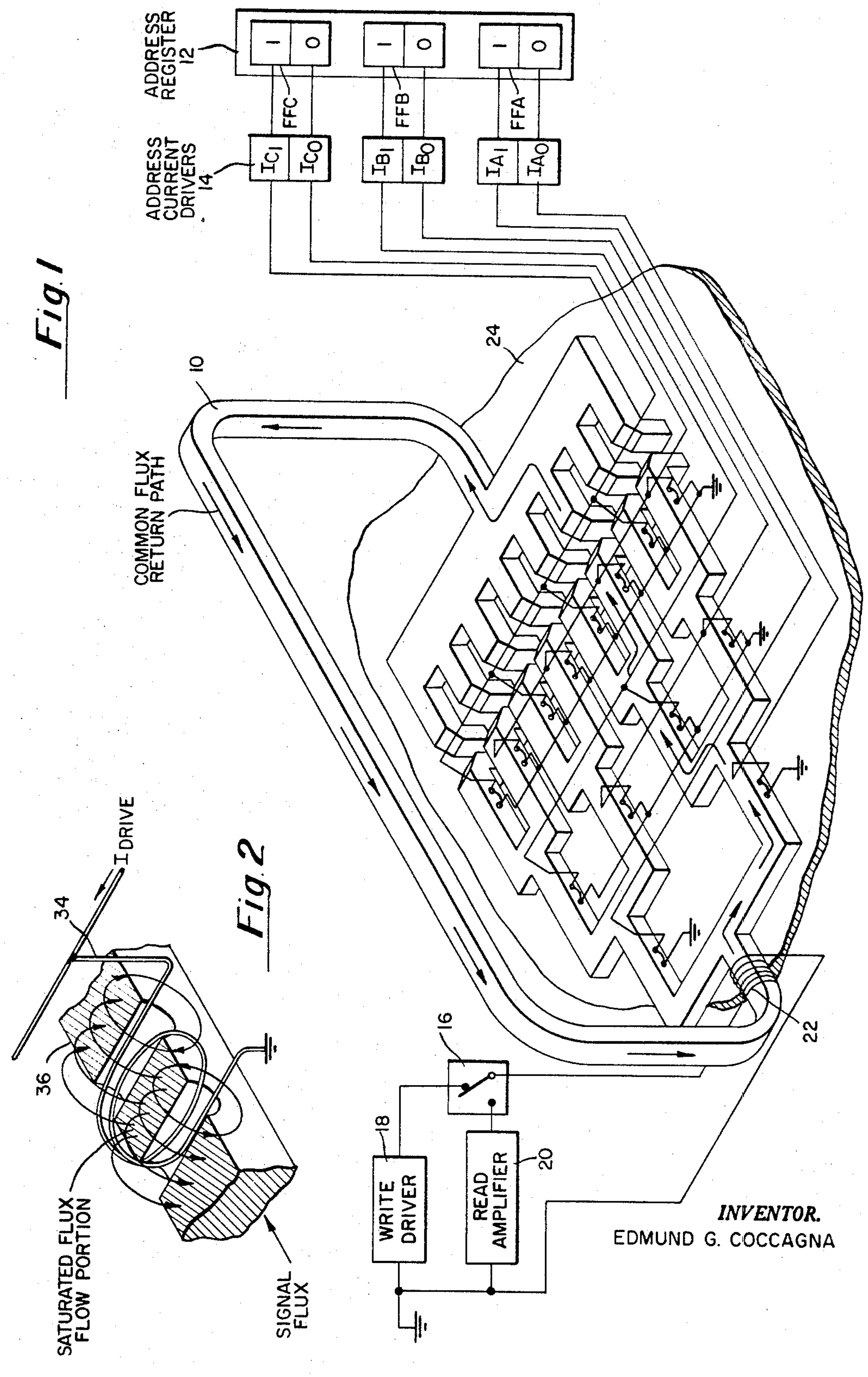
FIG. 1 is a multichannel magnetic head in accordance with one illustrative embodiment of the invention.
FIG. 2 is a sectional view used in explaining the flux saturating action of a segment.

Referring now to FIG. 1 there is shown an arrangement for magnetic recording on a multichannel magnetic medium utilizing the technique of longitudinal recording. Generally, the arrangement comprises a read-write head 10, an address register 12 and a plurality of address current drivers 14. The arrangement may be utilized for either reading or writing by means of a switching means 16 which can alternately connect a write driver 18 or a read amplifier 20 to a signal coil 22. The magnetic medium is indicated at 24.

The complete flux path of head 10 is physically subdivided into a plurality of flux paths progressively arranged in successive stages. Each succeeding stage branches into an increasing number of paths to provide a final stage having the number of recording segments desired. The flux return portion of each of the plurality of segments is physically rejoined to the common flux path portion of the head to provide the return path.

As will presently be explained, each of the flux paths of each stage is adapted to receive a wire carrying an electric current, the magnetic field of which provides magnetic saturation in a small cross section of the flux path in which it is located. The manner in which saturation is accomplished will be discussed in connection with FIG. 2.

The address register 12 shown in FIG. 1 comprises a plurality of bistable devices FFA, FFB and FFC.

In the present configuration a flip-flop is used with each successive stage of segments. Each stable side of a respective stage flip-flop is connected to a current driver $I_{C_1}$, $I_{C_0}$, etc., associated with alternate segments of the stage.

As is shown in FIG. 2, when a relatively large drive current, I drive, is sent through the conductor 34 in the direction indicated, a circular magnetic field is set up in magnetic material 36 around the conductor in the direction shown by the arrows. The net effect of this flux is to magnetically saturate the material in the portion encircled by the conductor 34. If the maximum amplitude of the signal flux is less than the amplitude of the flux causing this saturation, the flow of signal flux will be blocked so long as the drive current is maintained. It is this principle that is relied upon to provide the selection of a particular head segment.

Returning to FIG. 1, a write operation is accomplished by connecting the head coil 22 to the write driver 18 by way of switch 16. The address register 12 is shown in binary code, and the three flip-flops FFA, FFB and FFC are used to identify each of the eight individual segments, since the base 2 raised to the third power $2^{(3)}$ is equal to 8. Each of these individual segments of the recording head is, of course, capable of recording a separate and different channel.

| FFA | FFB | FFC | Selected channel |
|---|---|---|---|
| 0 | 0 | 0 | #1 |
| 0 | 0 | 1 | #2 |
| 0 | 1 | 0 | #3 |
| 0 | 1 | 1 | #4 |
| 1 | 0 | 0 | #5 |
| 1 | 0 | 1 | #6 |
| 1 | 1 | 0 | #7 |
| 1 | 1 | 1 | #8 |

Figure 3:
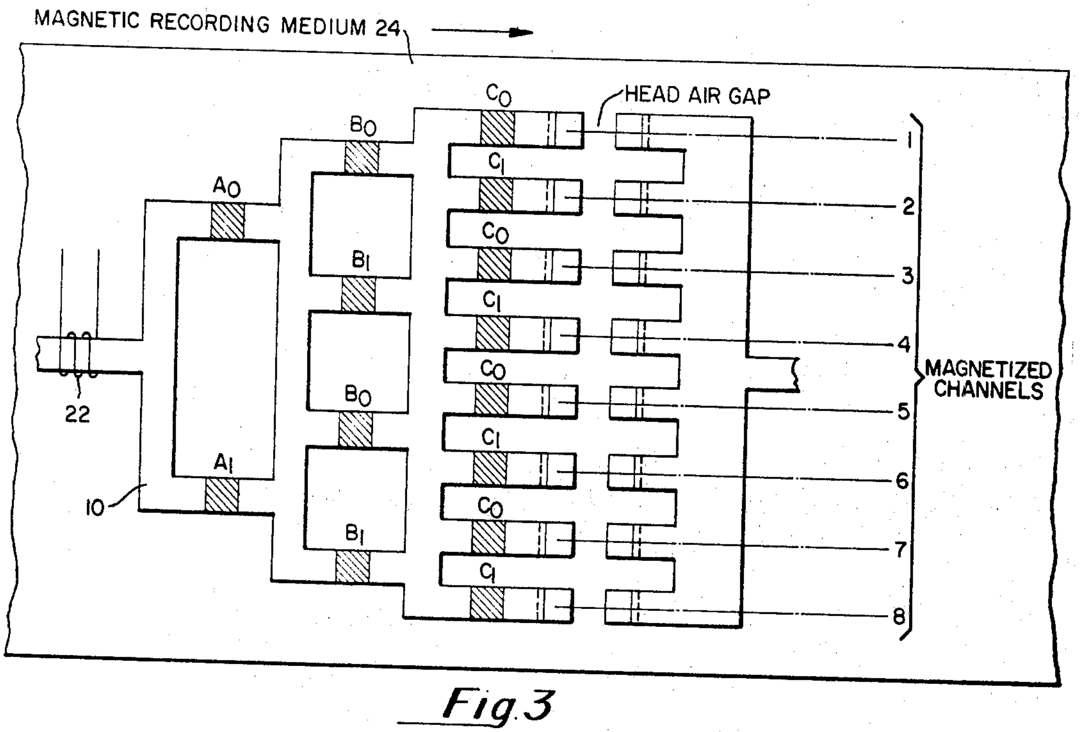
FIG. 3 is a top view of a sectional portion of the head showing the saturating signals and the channel designations on the recording medium.

As will be observed by reference to FIG. 3, a careful tracing of the binary signals supplied by the flip-flops of the address register, namely, $A_0A_1$, $B_0B_1$, and $C_0C_1$, make it possible to identify the particular air gap which will allow the passage of flux therethrough. For example, if it is desired to write on channel #6, magnetic flux must be permitted to flow only across the air gap adjacent that particular channel. Since signal flux would flow across all eight air gaps unless it was inhibited, it is necessary to block the flux flow through those air gaps which are not selected. To do this, the flip-flop signals from the address register must block the flux flow in all leg segments except the one corresponding to the chosen channel.

In FIG. 3, the signal noted adjacent the cross-hatched section of each leg segment is the flip-flop signal which will effectively block the flux flow through that segment.

To write on the recording medium 24 in channel #6, the flip-flop signals must block the flux flow through air gaps 1, 2, 3, 4, 5, 7 and 8. If the first stage flip-flop FFA of the address register 12 (FIG. 1) produces a binary 0 output signal, which is noted herein as $A_0$, the flux will be blocked in air gaps 1, 2, 3 and 4. Next, if the second stage flip-flop FFB produces a binary 1 corresponding to output signal $B_1$, the flux will be inhibited through air gaps 7 and 8. If, finally the flux is blocked through air gap 5 by the presence of a binary 0 from the third stage flip-flop FFC ($C_0$) all gaps will be prevented from writing in their respective channels, except air gap #6. Thus, the binary address corresponding to channel #6 is 010. Following the same sequence, the binary address of each channel illustrated in FIG. 3 is tabulated below.

| Channel | Binary Output Signal | | |
|---|---|---|---|
| | FFA | FFB | FFC |
| #1 | 1 | 1 | 1 |
| #2 | 1 | 1 | 0 |
| #3 | 1 | 0 | 2 |
| #4 | 1 | 0 | 0 |
| #5 | 0 | 1 | 1 |
| #6 | 0 | 1 | 0 |
| #7 | 0 | 0 | 1 |
| #8 | 0 | 0 | 0 |

Figure 4:
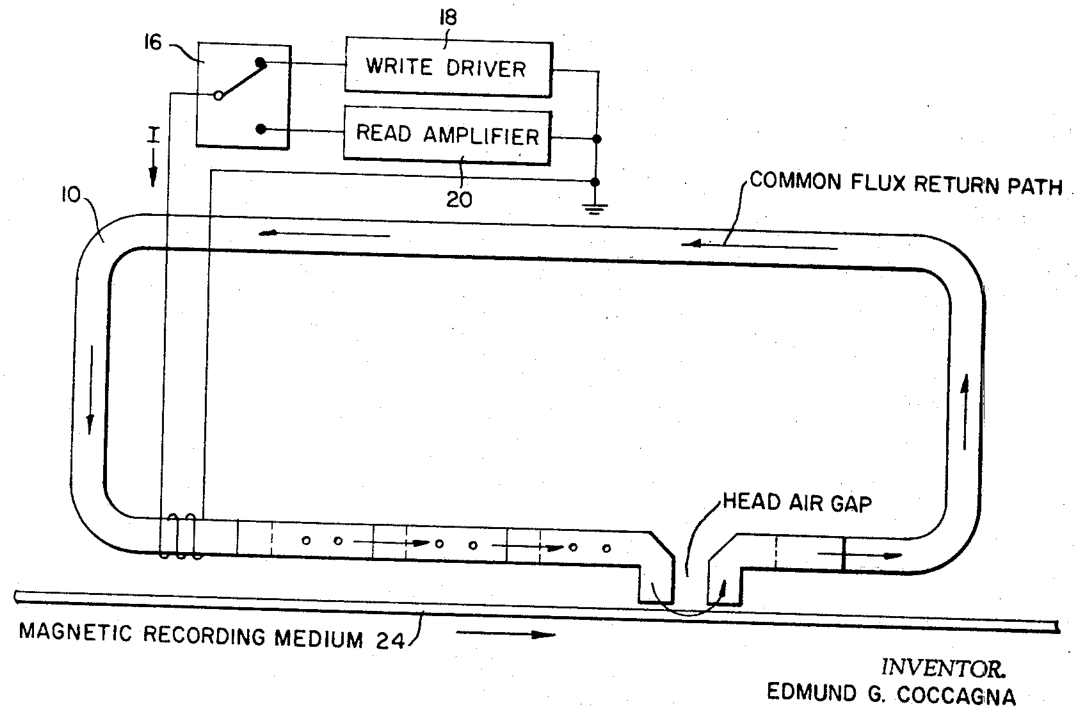
FIG. 4 is a side view of the head illustrating signal flux flow.

After the channel addressed by the flip-flop signals has been selected, it is seen in FIG. 4 that the switch 16 provides for the connection of write driver 18 to head winding 22. A write signal from the driver 18 then supplies the current (I) to the head winding (N turns) and the magnetomotive force (NI) created sends flux through the unblocked segments and corresponding air gap.

As shown in FIG. 4, part of the flux traveling across the magnetic head air gap couples to the moving magnetic recording medium so as to saturate it in the desired pattern of the writing signal from write driver 18. Of course, it is seen from FIGS. 1 and 4 that, regardless of the air gap selected, the flux flow travels a common return path around the head material to complete the flux path circuit.

Similarly, if it is desired to read the information contained in a given channel or track the address register 12 sends the identifying binary signal to block the flow of signal flux through all but the air gap associated with that channel. Note however, that switch 16, illustrated in FIG. 4 for a write operation, must be operated to connect the head winding 22 to read amplifier 20. In a read operation, the magnetic signal pattern previously impressed on the channels of the moving medium 24 by a writing operation is capable by its movement past the head gap of creating a flux flow in the head 10. This signal flow induces a corresponding signal in the head winding 22 which is applied to read amplifier 20. Consequently, the signal pattern previously imposed on the medium is intelligently recovered for subsequent reproduction.

Figure 5:
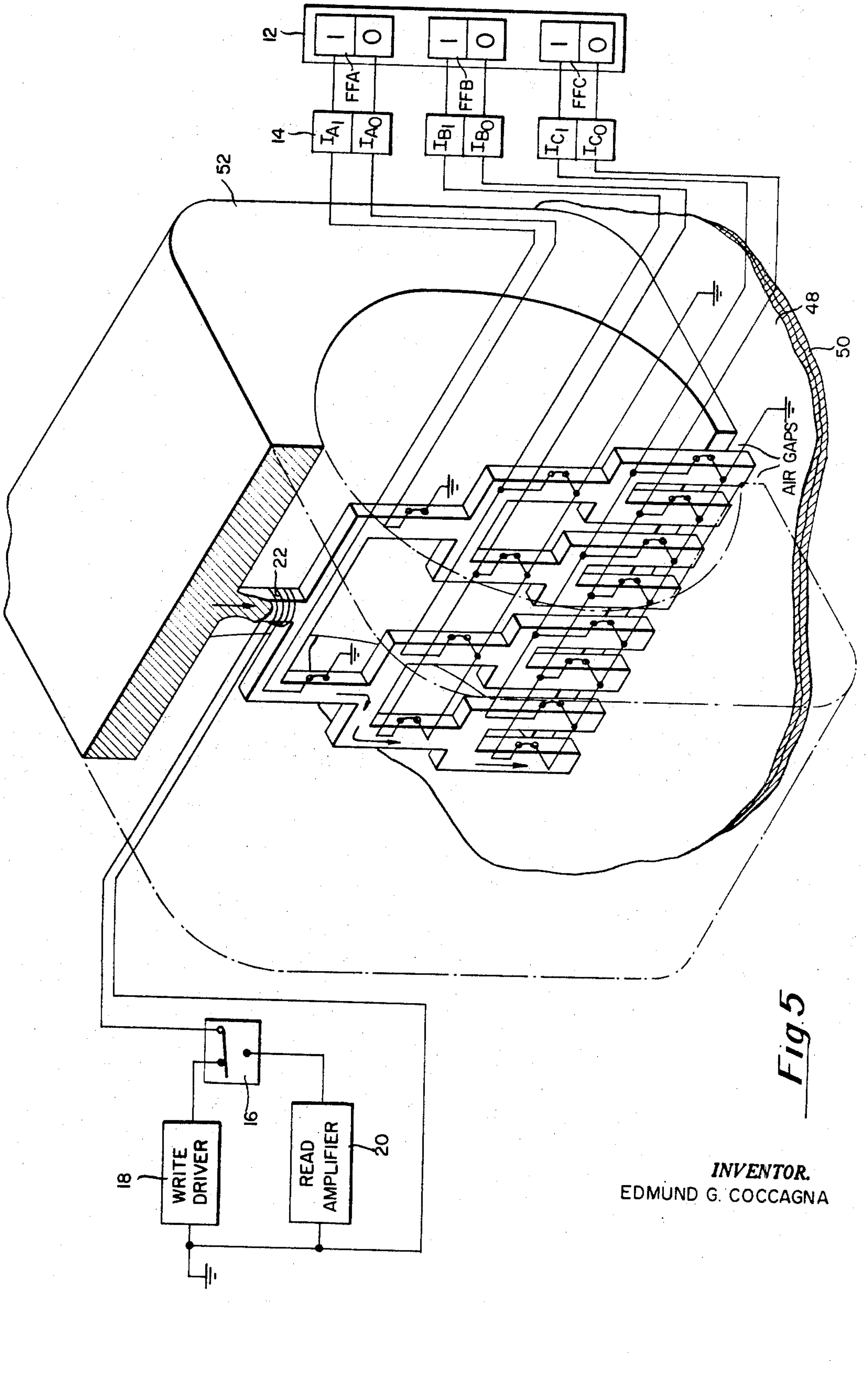
FIG. 5 is a sectional top plan view showing the arrangement of flux paths in a strip type head in accordance with another embodiment of the invention.

In the embodiment of FIG. 5 the invention is utilized for the purpose of vertical recording. Similar components in both embodiments bear similar reference numerals.

In vertical recording, the magnetic medium comprises a magnetic material 48 on a base 50 of soft (high permeability) material which material provides a return path for the flux. The magnetic head 52 is constructed somewhat differently from the head 10 shown in FIG. 1. The plurality of flux paths is arranged as a planar reed centrally positioned in a C-shaped yoke, as, for example, the middle arm in an E-shaped configuration. The planar reed extends into the single air gap so as to provide, at the lower reaches of the reed, two air gaps for each one in the former configuration.

However, although the physical embodiments are somewhat different, the concept and operation of the multiple channel head feature is identical in both cases. Thus, the flip-flops FFA, FFB and FFC of the address register 12 determine the selected head and the position of switch 16 specifies the operation to be performed. If a write operation is indicated, flux flow is initiated in the central leg of the head 52 by the operation of the write driver 18 which causes a current flow through coil 22. It flows from the addressed segment of the central reed, through the magnetic medium 48 in a direction perpendicular to the medium surface, passes into and through the base material 50 and returns to the central reed from both outside portions of the body of head 52.

Thus, the flux flow is vertical with respect to plane surface of the magnetic medium, and the recorded pattern is also vertical.

If switch 16 denotes a read operation, the presence and passage of a magnetized element in the selected channel on the magnetic medium 48 initiates a flow of flux along the flux path between the selected segment of the central reed on head 52 and the base material 50. The flux flow is in a direction determined by the polarity of the element magnetization. Thus, it induces a signal in the coil 22 having an information pattern which corresponds to the magnetized elements previously recorded on the medium. Therefore, as in the previous configuration, the recorded information is capable of being reproduced.

It should be finally noted that it is the general purpose of a recording head to produce a highly localized magnetic field of controllable intensity. The need for a highly localized field is evident when it is considered that it is desirable to alter the state of magnetization in a very small region of the medium if a high density of information is to be achieved. Although many physical shapes for the field defining structure have been utilized, essentially they all fall into two broad classes. These are: the gap type configuration and the strip type structure. It should be obvious from the foregoing description that the present invention may be utilized with either type.

Also notable is the fact that while a binary address selection system was illustrated and described as the preferred embodiment, it is, of course, understood that any scheme of address selection is equally applicable. For example, the multichannel head could be combined with a conventional switching means as in a multibranch switching tree. This and other examples will suggest themselves to those skilled in the art to which this disclosure relates, and it is not the intention of this description to be restricted to the embodiment disclosed. Obviously, many modifications and variations of the present invention are possible in light of the above teachings. It is therefore to be understood that the scope of the appended claims is intended to include the present invention although it is practiced other than as specifically described and illustrated.

I claim:

1. A multichannel, multipurpose magnetic head for use in a multitrack recording/reproducing system comprising a magnetic core member having a singular continuous and a plurality of discontinuous flux path portions, a single coil wound upon the core member in the continuous flux path portion thereof, said coil being switchably coupled for alternate connection to a write driver and to a read amplifier for alternate respective use as a recording and reproducing coupling means in said system, said discontinuous plural portion of said core including a plurality of core segments which comprise a plurality of successive stages, each succeeding stage having a progressively higher plurality of segments and further wherein the number of said flux path discontinuities corresponds to the plurality of segments in the final stage of succession to provide said core with a plurality of flux path discontinuities and a core segment selection means individually connected to each of said plurality of core segments whereby said magnetic head may be alternately utilized for selectively writing and selectively reading any of a plurality of tracks of a multichannel recording/reproducing system.

2. A multichannel, multipurpose magnetic head for use in a multitrack recording/reproducing system comprising a magnetic core member having a commonly singular and a separately plural flux path portion, a single signal coil wound upon the singular continuous flux path portion thereof, said coil being switchably coupled for alternate connection to a write driver and to a read amplifier for alternate respective use as a recording and reproducing coupling means in said system, a plurality of discontinuous core segments comprising a final stage of a plurality of successive stages of increasing core pluralities which is equal to the product of the base two raised to a power corresponding to the number of said successive stages, said discontinuous segments being positioned in said core member to provide the plurality of discontinuous flux paths and a core segment discontinuous flux path selection means individually connected to each of said plurality of core segments whereby said magnetic head may be alternately utilized for selectively writing and selectively reading any of a plurality of tracks of a multichannel recording/reproducing system.

3. A multitrack recording/reproducing magnetic head selection system comprising a magnetic head with a core member having a continuous and a discontinuous flux path portion, a single signal coil wound upon the continuous flux path portion thereof, said coil being switchably coupled for alternate connection to a write driver and to a read amplifier for alternate respective use as a recording and reproducing coupling means in said system, said magnetic core member further including a plurality of core segments comprising a final stage of a plurality of successively connected stages, each of the successive stages having increasing pluralities of core segments expanding in a manner corresponding to a binary code progression, said plurality of core segments positioned to provide a plurality of alternate flux paths, each having a flux path discontinuity and a core segment discontinuous flux path selection means individually connected to each of said plurality of core segments whereby said magnetic head may be alternately utilized for selectively writing and selectively reading any one of a plurality of tracks on the recording medium of a recording/reproducing system.

4. The magnetic head selection system as set forth in claim 3 wherein the core segment selection means comprises an address register having a plurality of bistable circuits and a plurality of selection coils individually wound upon the core segments of the magnetic head, each of said selection coils being connected to a bistable circuit to receive and be activated by one of the stable output signals from the bistable circuit.

5. The magnetic head selection means as set forth in claim 4 wherein said individual selection coils are wound upon the individual core segments of the magnetic head in a manner and direction such that upon activation of a particular selection coil, the core segment associated therewith is magnetically saturated in a direction perpendicular to signal flux flow therethrough.

6. A multichannel magnetic head for use in a multitrack recording/reproducing system comprising a magnetic core member having a principal trunk core portion and a branching core portion connected thereto, said branching core portion having a cascaded succession of core stages composed of successively increasing pluralities of branching core segments, and including a final stage whose core segments are magnetically discontinuous, a signal coil wound upon said principal trunk portion and a segment selecting means individually coupled to each of said plurality of core segments in each of the successive stages whereby the activation of said selecting means directs the flow of magnetic flux through selected core segments of the successive stages in the second portion.

7. A multichannel magnetic head as set forth in claim 6 wherein the segment selecting means comprises a plurality of separate coil means individually coupled to each of the segments of the succesive stages and an address register with its output means coupled to said plurality of coil means whereby particular, separate coil means are selectively activated in response to the signal output content of said address register to block the flow of magnetic flux through the core segment individually coupled thereto by magnetic saturation.

8. A multichannel magnetic head as set forth in claim 7 wherein said address register comprises a plurality of bistable circuits, each having a first output signal terminal commonly connected to the separate coil means of alternate core segments of one of the successive stages, and each bistable circuit also having a second output signal terminal commonly connected to the separate coil means of the remaining core segments of the same stage.

9. A magnetic head for reading and writing comprising, a magnetic core member, a read-write coil wound on said member adapted for receiving an induced EMF and for applying a magnetomotive force respectively, the core member extending outwardly from the location of said read-write coil in a plurality of discrete stages which divide and subdivide in predetermined fashion to finally provide a plurality of flux path core segments which include and define $n$ air gaps, a plurality of one or more bistable circuits respectively coupled to each discrete stage, by means connecting each output of a respective bistable circuit with selected flux path core segments in each stage, said bistable circuits including means adapted to apply each stable output signal to one of said flux path segments to provide a blocking of flux flow therethrough by means of magnetic saturation.

10. A multichannel magnetic head for reading and writing comprising, a magnetic core member, a read/write coil wound on said member for receiving an induced EMF during the reading operation and for supplying a magnetomotive force during the writing operation, the core member branching outward from the location of said read/write coil wound thereon into a plurality of successively cascaded stages, each succeeding stage providing an increasing plurality of flux path branches with the final stage having *n* branches, each of the *n* branches in the last stage including a magnetically discontinuous portion, a plurality of selecting coils, individually and respectively coupled to each of said branches of each of said stages, at least one bistable circuit coupled to each successive stage, said bistable circuit having first and second output terminals respectively connected to the selecting coils of alternate branches of its coupled stage whereby an output signal from each output terminal of the bistable circuit provides a blocking saturation signal to at least one of said branches of one successive stage of the magnetic core.

11. A magnetic head for reading or writing comprising, a magnetic core member, a read-write coil on said member adapted for receiving an induced EMF or for supplying a magnetomotive force respectively, the core member being arranged in transfer tree or multibranched tree fashion, so as to provide a plurality of flux paths which include *n* air gaps, an address means comprising, a plurality of bistable devices having first and second outputs, means connecting the first output of a bistable device with a group of flux paths in said stage, and for connecting the second output of said bistable device with the remaining flux paths in a respective stage, whereby the conductive condition of said bistable devices defines an address which determines the completed flux path to a selected one of said *n* air gaps.

References Cited

UNITED STATES PATENTS

| | | | |
|---|---|---|---|
| 2,300,320 | 10/1942 | Swartzel | 179—100.2 |
| 2,915,597 | 12/1959 | Wanlass et al. | 179—100.2 |

BERNARD KONICK, *Primary Examiner.*

B. L. HALEY, *Assistant Examiner.*